US009248867B2

(12) United States Patent
Chopra

(10) Patent No.: US 9,248,867 B2
(45) Date of Patent: Feb. 2, 2016

(54) LOCKING PLUG FOR PANEL OPENING

(71) Applicant: Toyota Motor Engineering & Manufacturing North America, Inc., Erlanger, KY (US)

(72) Inventor: Vikram Chopra, Phoenix, AZ (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 106 days.

(21) Appl. No.: 14/079,745

(22) Filed: Nov. 14, 2013

(65) Prior Publication Data

US 2015/0129601 A1 May 14, 2015

(51) Int. Cl.
*B62D 25/24* (2006.01)

(52) U.S. Cl.
CPC .................................... *B62D 25/24* (2013.01)

(58) Field of Classification Search
CPC ................................ B65D 39/04; B62D 25/14
USPC ................... 296/1.06; 220/DIG. 19, 236, 787
See application file for complete search history.

(56) References Cited

U.S. PATENT DOCUMENTS

| | | | | |
|---|---|---|---|---|
| 3,175,727 | A * | 3/1965 | Piel | 220/236 |
| 4,334,632 | A | 6/1982 | Watanabe | |
| 4,676,391 | A * | 6/1987 | Peterson | 220/233 |
| 4,784,285 | A * | 11/1988 | Patel | 220/782 |
| 4,998,642 | A | 3/1991 | Kraus | |
| 2004/0034982 | A1* | 2/2004 | Wieber et al. | 29/428 |
| 2014/0015286 | A1* | 1/2014 | Lacroix | 296/208 |

FOREIGN PATENT DOCUMENTS

| | | | |
|---|---|---|---|
| JP | 2013021791 | A | 1/2013 |
| WO | 2004069634 | A1 | 8/2004 |

* cited by examiner

*Primary Examiner* — Jason S Morrow
(74) *Attorney, Agent, or Firm* — Christopher G. Darrow; Darrow Mustafa PC

(57) ABSTRACT

An apparatus for sealing a panel opening includes a plug body including an interior portion and an exterior portion. The exterior portion of the plug body includes a pair of opposed sealing surfaces forming an annular ring. The apparatus also includes a locking blade extending from the interior portion of the plug body across the exterior portion of the plug body. The locking blade is configured to rest in a first position disposed within the annular ring and a second position extending beyond the annular ring.

15 Claims, 3 Drawing Sheets

300
310
500
302
306
312
304

LOCKING PLUG FOR PANEL OPENING

BACKGROUND

Automotive body panels, such as underbody panels, door panels, engine box panels, etc. are designed to include many shapes and sizes of openings, both to reduce the weight of the panels and to allow access to operators for tools and various fasteners to assemble the vehicle. After assembly of the vehicle, some of these openings can end up in positions, for example along the underbody, such that the openings allow noise, debris, or both noise and debris to pass through the body panel and increase the noise within the interior cabin of the vehicle or cause corrosion of other vehicle parts exposed to the debris.

Known measures to seal openings from debris and noise within body panels, for example, using the prior art plug 100 shown in FIG. 1, are not sufficient when forces on the prior art plug 100 caused by, for example, road debris or excess pressure, push the prior art plug 100 out of the opening, allowing the noise and debris to enter the opening. This condition is shown in prior art FIG. 2. Prior art FIG. 2 shows an opening 200 disposed in a body panel 202. In this example, the body panel 202 is an underbody panel. FIG. 2 also shows the prior art plug 100 of FIG. 1 in a pushed-out or unseated position. This unseated position of the prior art plug 100, which was previously seated, can be caused by excess pressure or debris forcing the prior art plug 100 from the seated position within the opening 200 of the body panel 202 to the unseated or pushed-out position.

The prior art plug 100 of FIGS. 1 and 2 can include an interior portion having a recessed trough 102 designed for use by an operator for insertion of the prior art plug 100. The prior art plug 100 can also include an exterior portion having an annular ring 104, the annular ring 104 formed of two opposed sealing surfaces 106, 108. The first (e.g. top) sealing surface 106 of the annular ring 104 is configured to lie against the front face of the body panel 202 when the prior art plug 100 is seated within the opening 200 and the second (e.g. bottom) sealing surface 108 of the annular ring 104 is configured to lie against the back face of the body panel 202 when the prior art plug 100 is seated within the opening 200.

SUMMARY

An improved apparatus for sealing the opening within a body panel is disclosed. The improved apparatus includes a plug body having an exterior portion forming an annular ring that seals to the edge of the body panel at the location of the opening and a locking blade configured to rest in a first position within the annular ring and extend beyond the annular ring in a second position such that the blade creates frictional interference with the front face of the body panel that assists in keeping the plug body seated within the opening despite impacts against the plug body from external debris or pressure forces.

One aspect of the disclosed embodiments is an apparatus for sealing a panel opening. The apparatus includes a plug body including an exterior portion forming an annular ring and a locking blade. The locking blade extends within the annular ring in a first position and extends beyond the annular ring in a second position.

Another aspect of the disclosed embodiments is an apparatus for sealing a panel opening. The apparatus includes a plug body including an interior portion and an exterior portion. The exterior portion of the plug body includes a pair of opposed sealing surfaces forming an annular ring. The apparatus also includes a locking blade extending from the interior portion of the plug body across the exterior portion of the plug body. The locking blade is configured to rest in a first position disposed within the annular ring and a second position extending beyond the annular ring.

BRIEF DESCRIPTION OF THE DRAWINGS

The description herein makes reference to the accompanying drawings wherein like reference numerals refer to like parts throughout the several views, and wherein.

DETAILED DESCRIPTION

An improved apparatus for sealing the opening within a body panel is disclosed. One example apparatus includes a plug body having an interior portion and an exterior portion. The exterior portion of the plug body can include a pair of opposed sealing surfaces that form an annular ring for sealing the edges of the plug body to the edges of the opening within the body panel. The example apparatus can also include a locking blade that extends from the interior portion of the plug body across the exterior portion of the plug body. The locking blade can be configured to rest in a first position disposed within the annular ring for ease of installation and a second position extending beyond the annular ring to create frictional interference between the locking blade and the body panel to assist in retaining the plug body in a seated position when faced with increased forces caused by debris impact or excess pressure.

Figure 1:
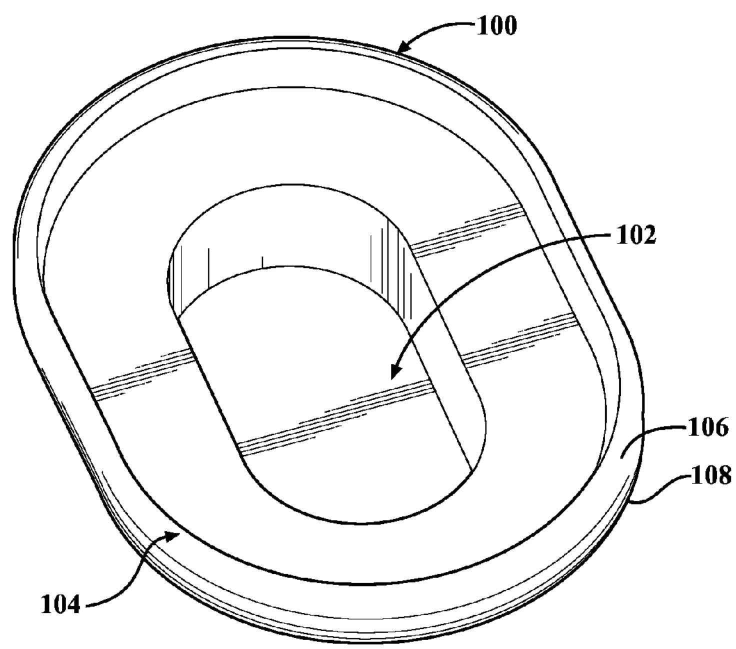
FIG. 1 is a perspective view of a prior art plug.
Figure 3:
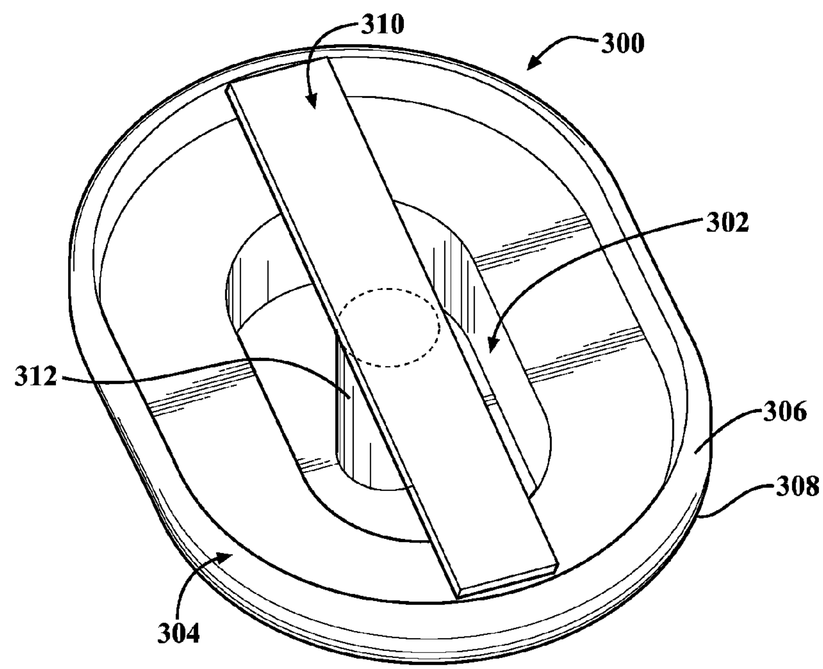
FIG. 3 is a perspective view of a locking plug in a first, unlocked position.

FIG. 3 is a perspective view of a locking plug 300 in a first, unlocked position. The locking plug 300 can include an interior portion having a recessed trough 302 designed to assist an operator in installation of the locking plug 300 into an opening within a body panel. The locking plug 300 can also include an exterior portion having an annular ring 304, the annular ring 304 formed of two opposed sealing surfaces 306, 308. The first (e.g. top) sealing surface 306 of the annular ring 304 can be configured to lie against the front face of a body panel when the locking plug 300 is seated within an opening within the body panel. The second (e.g. bottom) sealing surface 308 of the annular ring 304 can be configured to lie against the back face of a body panel when the locking plug 300 is seated within an opening within the body panel. Though the example design of the annular ring 304 for the locking plug 300 is described in a manner consistent with the prior art plug 100 and annular ring 104 as shown in FIG. 1, other configurations of the annular ring 304 allowing engagement with the edges of an opening in a body panel are also possible.

The locking plug 300 can also include a locking blade 310. The locking blade 310 shown in FIG. 3 is currently resting in a first position. In the first position the locking blade extends completely within the annular ring 304, for example, from one side of the exterior portion across the interior portion to the other side of the exterior portion of the locking plug 300. In this first position, it is possible for an operator to manipulate the locking plug 300 and annular ring 304 in a manner sufficient to install the locking plug 300 into an opening in a body panel without the locking blade 310 interfering with the installation process. The locking blade 310 is designed, in this example embodiment, to include a central stanchion 312 extending perpendicularly from the floor of the recessed trough 302 to hold the locking blade 310 at a specific height above the recessed trough 302 and the exterior portion as would be necessary to place the locking blade 310 into a second position as described below in FIG. 4.

Figure 4:
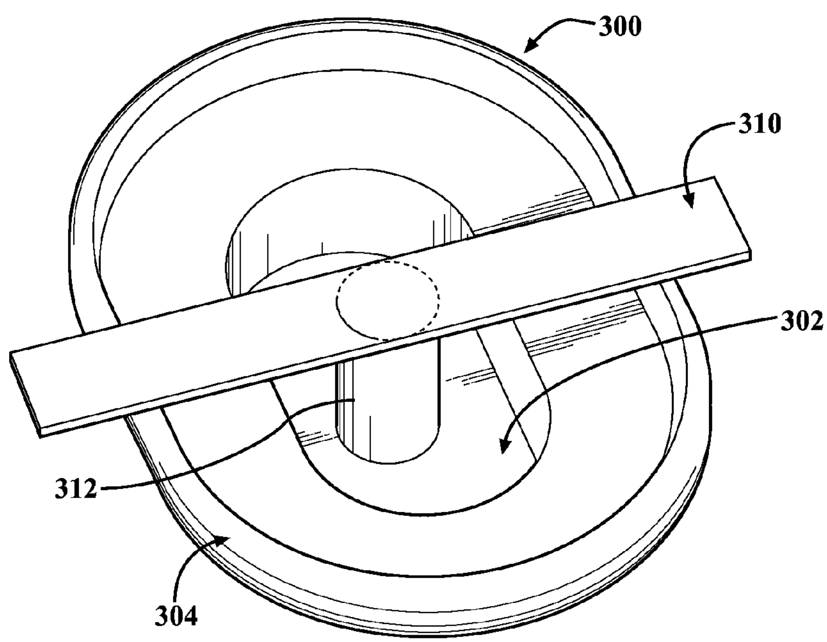
FIG. 4 is a perspective view of the locking plug of FIG. 3 in a second, locked position.

FIG. 4 is a perspective view of the locking plug 300 of FIG. 3 in a second, locked position. In this example, the second position of the locking blade 310 is perpendicular to the first position. In the second position, the locking blade 310 extends from the central stanchion 312 beyond the edges of the annular ring 304. The portions of the locking blade 310 that extend beyond the edges of the annular ring 304 in the second position are configured to lie against a front face of a body panel when the locking plug 300 is installed within a panel opening. In the second, locked position, the locking blade 310 can prevent the locking plug 300 from being forced into a panel opening by debris or excess pressure by increasing the friction that holds the locking plug against the body panel within the panel opening.

The locking blade 310 can be moved, for example, by an operator, between the first, unlocked position shown in FIG. 3 and the second, locked position shown in FIG. 4 by twisting the locking blade 310 in respect to the body of the locking plug 300. In the example in FIGS. 3 and 4, the central stanchion 312 can be designed to allow the central stanchion 312 to twist in respect to the lower floor of the recessed trough 302. This can be accomplished either by including a twisting mechanism within the body of the central stanchion 312 or by designing the central stanchion for insertion within an opening in the floor of the recessed trough 302. The locking blade 310 can also be designed to twist in respect to the central stanchion 312. Any twisting mechanism allowing the locking blade 310 to be moved between the first, unlocked position and the second, locked position is possible.

Figure 5:
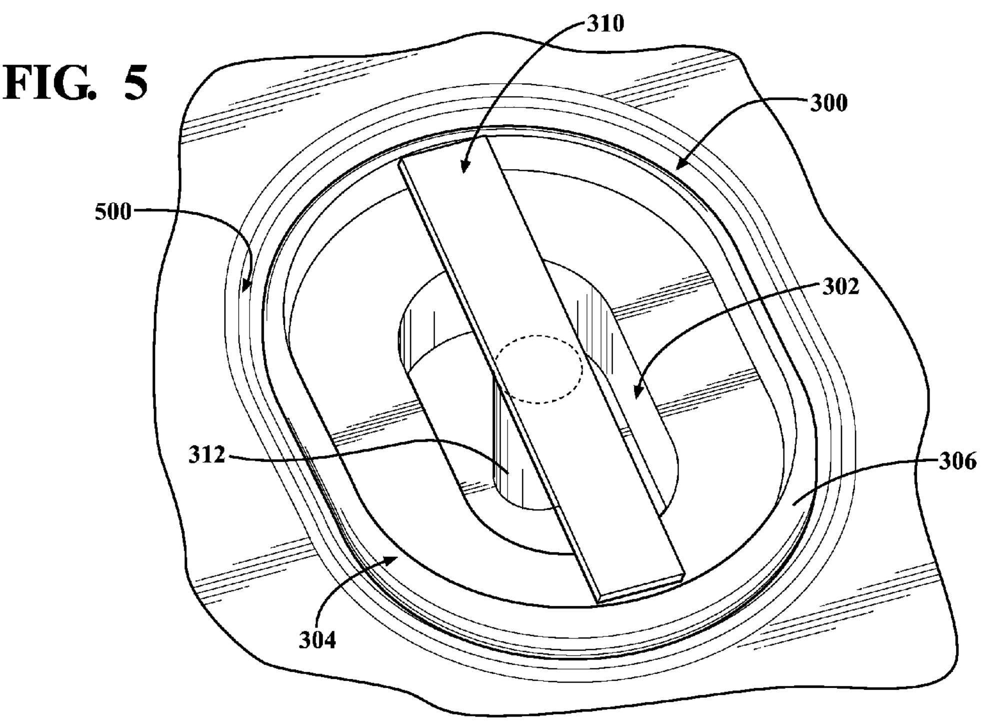
FIG. 5 is top view of the locking plug of FIG. 3 in the first, unlocked position while seated within an opening of a body panel.

FIG. 5 is top view of the locking plug 300 of FIG. 3 in the first, unlocked position while seated within an opening of a body panel 500. During installation of the locking plug 300, an operator can press the plug into the opening such that the first sealing surface 306 of the annular ring 400 lies against a front face of the body panel 500 as shown and the second sealing surface 308 of the annular ring 304 lies against a back face of the body panel 500, which is not shown based on the top view perspective of FIG. 5. The two sealing surfaces 306, 308 thus hold the locking plug 300 within the opening of the body panel 500 to stop debris and noise from entering the body panel 500. However, the sealing surfaces 306, 308 of the annular ring 304 are not configured to hold the locking plug 300 in the opening of the body panel 500 against high levels of force caused by impact of debris or excess pressure.

Figure 2:
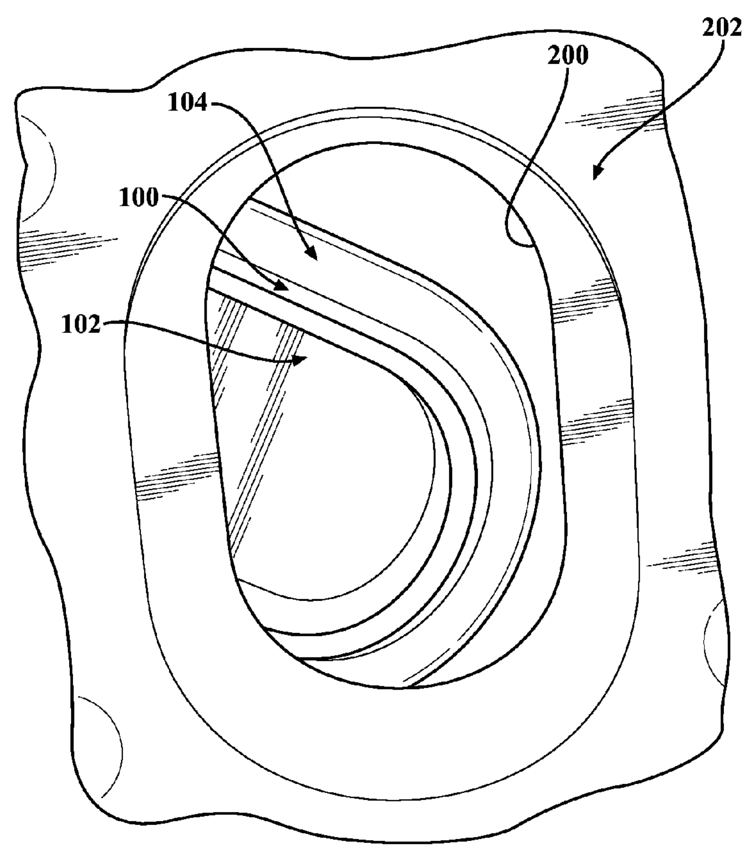
FIG. 2 is a top view of the prior art plug of FIG. 1 in an unseated position within an opening of a body panel.

Debris impact against the locking plug 300, can occur, for example, if the body panel 500 is an underbody panel of a vehicle exposed to the environment during driving conditions. That is, as a vehicle travels along a road, various sticks, stones, trash, or other objects can be thrown against the body panel 500 by the tires at a high speed and high force, knocking the locking plug 300 in the first position out of the opening in a manner similar to that shown in prior art FIG. 2. Another example of high pressure or impact force that can occur against a body panel is when a vehicle travels through a car wash. Various jets of water or soap or high pressure drying air can push against the locking plug 300, potentially dislodging the locking plug in the first position where the locking blade 310 remains within the annular ring 304.

Figure 6:
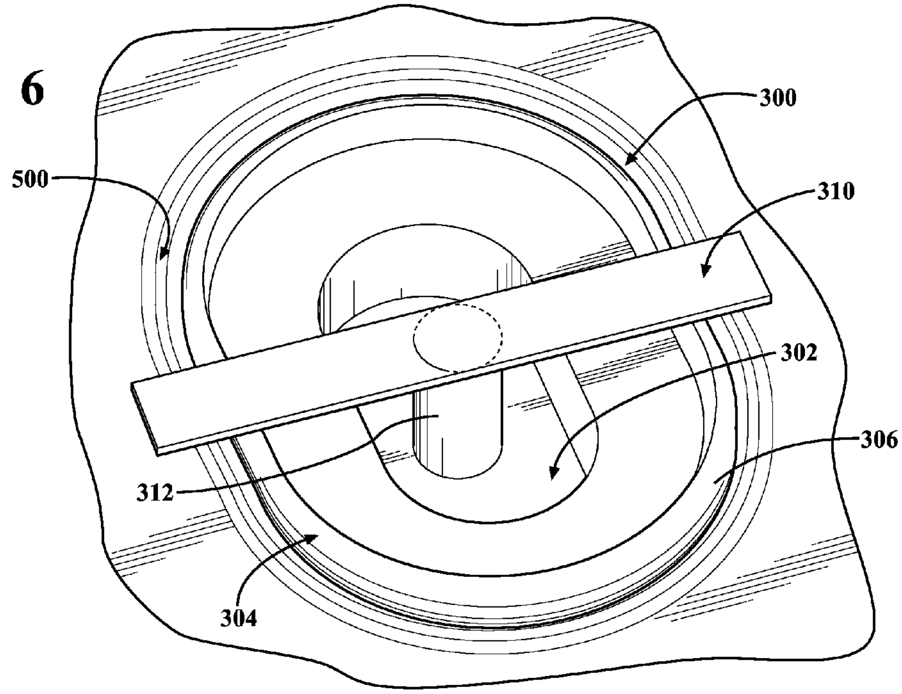
FIG. 6 is a top view of the locking plug of FIG. 4 in the second, locked position while seated within an opening of a body panel.

FIG. 6 is a top view of the locking plug 300 of FIG. 4 in the second, locked position while seated within the opening of the body panel 500 shown in FIG. 5. Once the locking plug 300 has been installed within the opening of the body panel 500 as shown in FIG. 5 with the locking blade 310 in the first, unlocked position, the operator can twist the locking blade 310 from the first, unlocked position, to the second, locked position as shown. This twisting of the locking blade 310 can be done either in respect to the floor of the recessed trough 302 or in respect to the central stanchion 312, depending on the design of the locking blade 310 and twist mechanism.

Once the locking blade 310 is twisted into the second, locked position, the outer edges of the locking blade extend beyond the annular ring 304 and the edges of the locking blade 310 lie, at least partially, against the front face of the body panel 500. The contact between the locking blade 310 and the front face of the body panel 500 adds a much greater frictional force that must be overcome to unseat the locking plug 300 from the opening within the body panel 500 than is present due to the opposed sealing surface 306, 308 overlapping with the edges of the body panel 500 at the location of the opening alone. Thus, various pieces of debris and instances of excess pressure are no longer capable of unseating the locking plug 300 from the opening within the body panel 500 once the locking blade is resting in the second, locked position.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for sealing a panel opening, comprising:
- a plug body including an exterior portion forming an annular ring; and
- a twisting locking blade;
  - wherein the locking blade extends within the annular ring in a first position; and
  - wherein the locking blade extends beyond the annular ring when twisted to a second position.

2. The apparatus of claim 1, wherein the first position of the locking blade is perpendicular to the second position.

3. The apparatus of claim 1, wherein movement of the locking blade between the first position and second position is performed by twisting the locking blade with respect to the plug body.

4. The apparatus of claim 1, wherein the annular ring includes two opposed sealing surfaces.

5. The apparatus of claim 4, wherein a first of the opposed sealing surfaces is configured to lie against a front face of a body panel when the plug body is installed within the panel opening.

6. The apparatus of claim 5, wherein the second of the opposed sealing surfaces is configured to lie against a back face of the body panel when the plug body is installed within the panel opening.

7. The apparatus of claim 1, wherein the plug body includes an interior portion having a recessed trough configured to assist in installation of the plug body into the panel opening disposed in a body panel.

8. The apparatus of claim 7, wherein the locking blade extends from the interior portion to the exterior portion of the body plug.

9. An apparatus for sealing a panel opening, comprising:

a plug body including an interior portion and an exterior portion, the exterior portion including a pair of opposed sealing surfaces forming an annular ring; and a locking blade extending from the interior portion of the plug body across the exterior portion of the plug body and configured to rest in a first position disposed within the annular ring and a second position extending beyond the annular ring, wherein movement of the locking blade between the first position and the second position is performed by twisting the locking blade with respect to the plug body.

10. The apparatus of claim 9, wherein a first of the opposed sealing surfaces is configured to lie against a front face of a body panel when the plug body is installed within the panel opening.

11. The apparatus of claim 10, wherein the second of the opposed sealing surfaces is configured to lie against a back face of the body panel when the plug body is installed within the panel opening.

12. The apparatus of claim 9, wherein the interior portion of the plug body includes a recessed trough configured to assist in installation of the plug body into the panel opening disposed in a body panel.

13. The apparatus of claim 9, wherein the first position of the locking blade is perpendicular to the second position.

14. The apparatus of claim 9, wherein the locking blade is configured to lie, at least partially, against a front face of a body panel when the plug body is installed within the panel opening and when the locking blade rests in the second position.

15. A locking plug for a panel opening, the locking plug comprising:

a plug body including an exterior portion forming an annular ring;

a locking blade; and a stanchion coupled to the locking blade and configured to selectively twist a position of the locking blade, with respect to the plug body, between an unlocked position with the locking blade extending within the annular ring and a locked position with the locking blade extending a distance beyond the annular ring.

* * * * *